United States Patent
Mroue

(10) Patent No.: US 10,478,825 B2
(45) Date of Patent: Nov. 19, 2019

(54) PORTABLE ELECTRIC AND HAND OPERATED HERB GRINDER

(71) Applicant: Heba Mroue, Toronto (CA)

(72) Inventor: Heba Mroue, Toronto (CA)

(73) Assignee: LUVNKURE INC., Ottawa, Ontario (CA)

( * ) Notice: Subject to any disclaimer, the term of this patent is extended or adjusted under 35 U.S.C. 154(b) by 924 days.

(21) Appl. No.: 14/885,144

(22) Filed: Oct. 16, 2015

(65) Prior Publication Data
US 2016/0106262 A1    Apr. 21, 2016

Related U.S. Application Data

(60) Provisional application No. 62/065,121, filed on Oct. 17, 2014.

(51) Int. Cl.
| | |
|---|---|
| *B02C 18/08* | (2006.01) |
| *B02C 23/10* | (2006.01) |
| *A47J 42/26* | (2006.01) |
| *A47J 42/30* | (2006.01) |
| *B02C 18/10* | (2006.01) |

(52) U.S. Cl.
CPC .............. *B02C 18/08* (2013.01); *A47J 42/26* (2013.01); *A47J 42/30* (2013.01); *B02C 18/10* (2013.01); *B02C 23/10* (2013.01)

(58) Field of Classification Search
CPC ........ A47J 42/16; B02C 23/10; B02C 18/062; B02C 18/065; B02C 18/08; B02C 18/083; H02J 7/0044

USPC ....................................................... 241/169.1
See application file for complete search history.

(56) References Cited

U.S. PATENT DOCUMENTS

| | | | |
|---|---|---|---|
| 6,377,022 B1 | 4/2002 | Rhoads | |
| 6,830,206 B2* | 12/2004 | Yang | A47J 42/46 |
| | | | 241/168 |
| 7,422,170 B2* | 9/2008 | Bao | B02C 18/24 |
| | | | 241/168 |
| 8,393,563 B2 | 3/2013 | Chaoui et al. | |
| 2012/0168544 A1* | 7/2012 | Chaoui | B02C 18/08 |
| | | | 241/68 |
| 2014/0261471 A1* | 9/2014 | Ruzycky | A24C 5/02 |
| | | | 131/108 |
| 2015/0298135 A1* | 10/2015 | Spielman | B02C 18/144 |
| | | | 241/101.01 |

* cited by examiner

*Primary Examiner* — Shelley M Self
*Assistant Examiner* — Jared O Brown
(74) *Attorney, Agent, or Firm* — Perry + Currier, Inc.

(57) ABSTRACT

A portable grinder for herb or vegetative material comprises a top section having a motor and disc with a plurality of top grinding knives protruding downward, a middle section having a plurality of bottom grinding knives protruding upward and a plurality of apertures, and a bottom section. In one embodiment, ground material is discharged through apertures in the middle section, where the size is regulated by a screen, and/or is retained in the middle section until the top section is removed. In a further embodiment, the grinder may be operated electrically or manually.

8 Claims, 4 Drawing Sheets

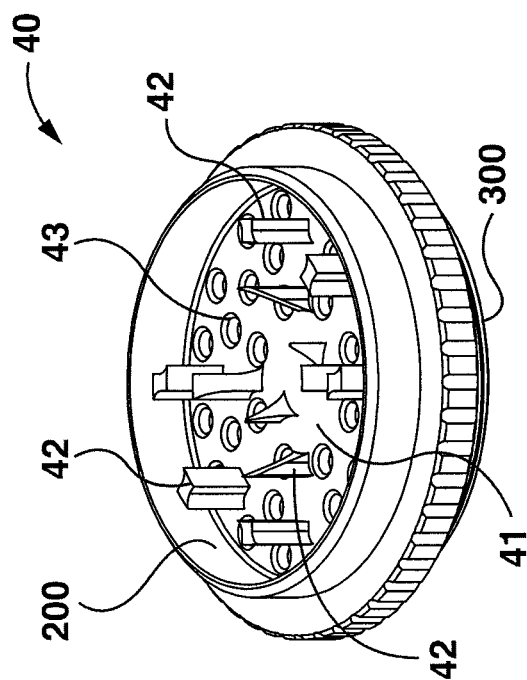
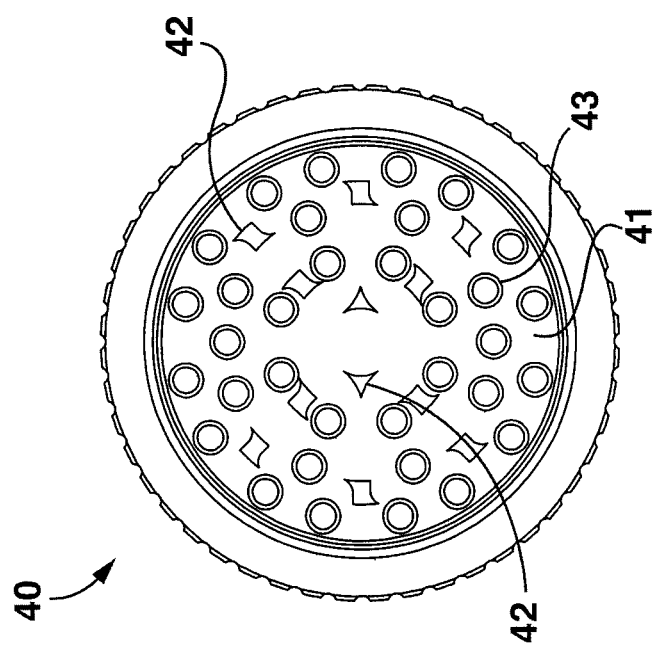

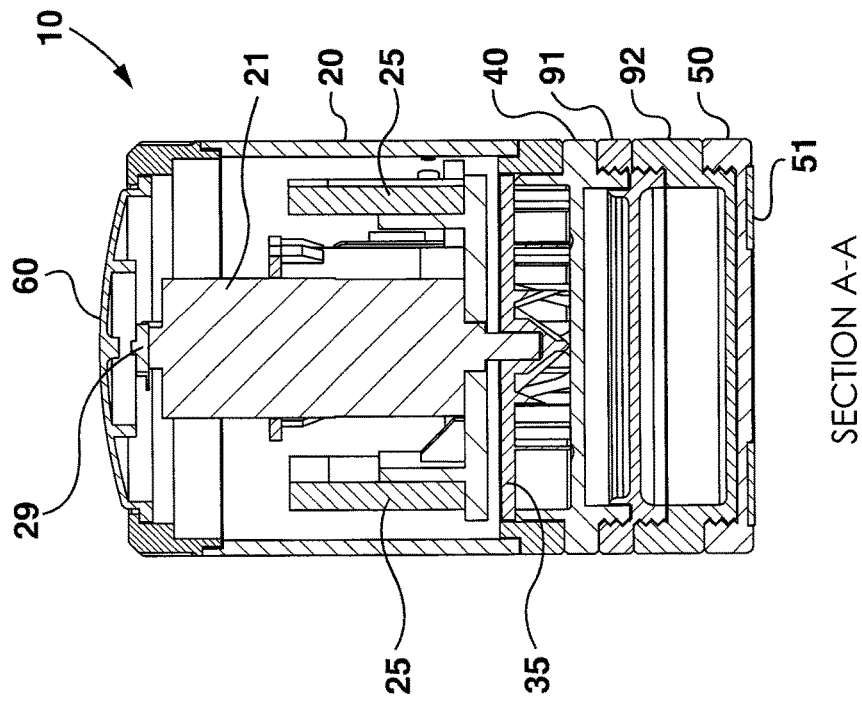
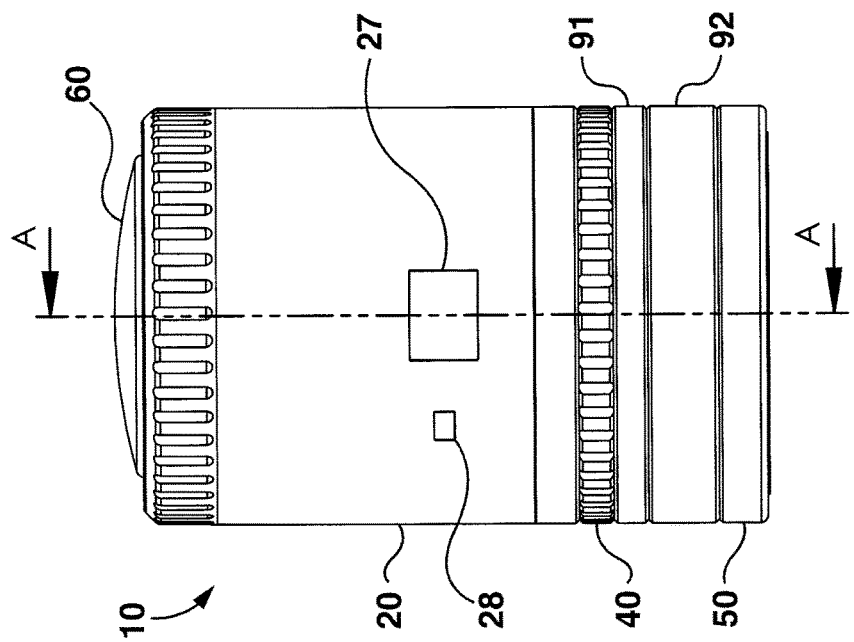

PORTABLE ELECTRIC AND HAND OPERATED HERB GRINDER

FIELD

The present specification relates generally to a grinder, and more particularly to a grinder that is portable and capable of being operated manually or electrically to shred, grind or comminute vegetative material.

BACKGROUND

There are many types of leafy plants that can be ingested by humans. Many of these herbs and plants are eaten as seasonings, or in the case of tobacco, may be ingested by smoking. Typically, when an herb, leaf, or other vegetative material is utilized as a seasoning or is smoked, the herb must first be dried and then ground to small sized particles.

There are many methods of grinding a dried herb. Before the advent of mechanical devices a dried herb was simply crushed in a person's hand. Though partially effective, the hand method was time consuming, unclean and was unable to provide consistency in the size of the ground particles.

Mechanical devices, both powered and not powered, are effective for grinding a dried herb or leaf. Unfortunately, many mechanical devices are dimensioned for use in a kitchen or other stationary environment. In order to use a mechanical grinding device, the dried herbs and leaves must be brought to where the device is located. For many applications this approach is impractical. For example, many smokers prefer to use fresh, recently-ground tobacco in their pipes or rolled into cigarettes.

Today, the most widely used portable herb grinder design is one with at least two chambers, a top cap, and a bottom cap. The top half of the first chamber is formed by the top cap. A plurality of grinding knives protrudes from the top cap into the volume of the first chamber. The bottom half of the first chamber also has a plurality of grinding knives and several apertures that lead into the second chamber. The bottom half of the second chamber is formed by the bottom cap of the grinder. Optionally, the second chamber can have a screen that leads into an optional third chamber for isolating the smallest particles, in which case the bottom half of the third chamber forms the bottom of the grinder.

A dried herb or leaf is placed inside the first chamber. The top cap is then rotated relative to the rest of the grinder allowing the grinding knives to cut the herb into smaller pieces. The smaller herb pieces are then passed through the apertures into the second chamber, and optionally through the screen into the third chamber if present. The pieces of ground, shredded or comminuted herb in the second chamber can then be returned to the first chamber for further grinding. The ground herb in the second or third chamber is collected in the bottom cap, which can removed by the user when ready to consume it.

There are, however, disadvantages of today's popular grinders. First, for users with arthritis or similar physical ailments that hinder their grip strength, conventional portable grinders can be very difficult to operate, as a significant amount of force is often needed to grind various amounts and kinds of leaves and vegetative material. Second, electrically powered grinders often lack portability, which is a disadvantage to users who wish to be able to grind fresh herbs or tobacco in locations where access to electrical outlets may be unavailable or inconvenient. Further, conventional powered appliances can be bulky and heavy, and inconvenient to carry on one's person. Even if an electric grinder is powered by rechargeable batteries, a user may forget to charge the grinder, or may drain any on-board battery supply through prolonged use.

Accordingly, there is an obvious need for a portable, rechargeable herb grinder that is capable of being operated both manually and under assisted power.

An additional advantageous feature of a portable herb grinder would be to include a means of storing the herb or vegetative material before or after grinding in a container that is integral with the grinder. In this manner, a person could transport material to be ground, grind dried herbs or leaves at any time and any place, and then store and carry a quantity of the recently ground leaves for future use.

SUMMARY OF THE PRESENT INVENTION

Herbs, tobacco and other vegetative material will often be shred or ground just before being used, in order to assure freshness of the shredded/ground material. In this specification methods and apparatus for grinding and comminuting are deemed to include methods and apparatus for shredding.

The present specification provides for a portable herb grinder comprising a top section having a motor, and a bottom opening, a disc having a plurality of top grinding knives, wherein the disc is connected to the motor for rotation within the bottom opening of the top section, and wherein the plurality of top grinding knives are oriented to protrude downward, a middle section having a top opening that is removably inserted into the bottom opening of the top section, a bottom opening, and a plate, wherein the plate comprises a plurality of bottom grinding knives protruding upward and a plurality of apertures, and a bottom section having a top opening that is removably attached to the bottom opening of the middle section.

The present specification further provides for a portable herb grinder comprising a storage section for transporting ground or unground materials along with the grinder. The present specification also provides for a grinder that may be operated both manually and under assisted power.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 2(*b*) depicts an isometric view of a plate of the portable herb grinder of FIG. 1.

FIG. 2(*c*) depicts an elevation view of a plate of the portable herb grinder of FIG. 1.

FIG. 3(*a*) depicts a plan view of a middle section of the portable herb grinder of FIG. 1.

FIG. 3(*b*) depicts an isometric view of a middle section of the portable herb grinder of FIG. 1.

FIG. 4(*a*) depicts an elevation view of one embodiment of an assembled portable herb grinder formed in accordance with the present invention, including an optional storage section.

FIG. 4(*b*) depicts a cross-sectional view of one embodiment of an assembled portable herb grinder formed in accordance with the present invention, including an optional storage section.

DETAILED DESCRIPTION

In describing the components of the portable herb grinder and alternative versions or embodiments, of some of these components, the same reference number may be used for elements that are the same as, or similar to, elements described in other versions or embodiments.

Figure 1:
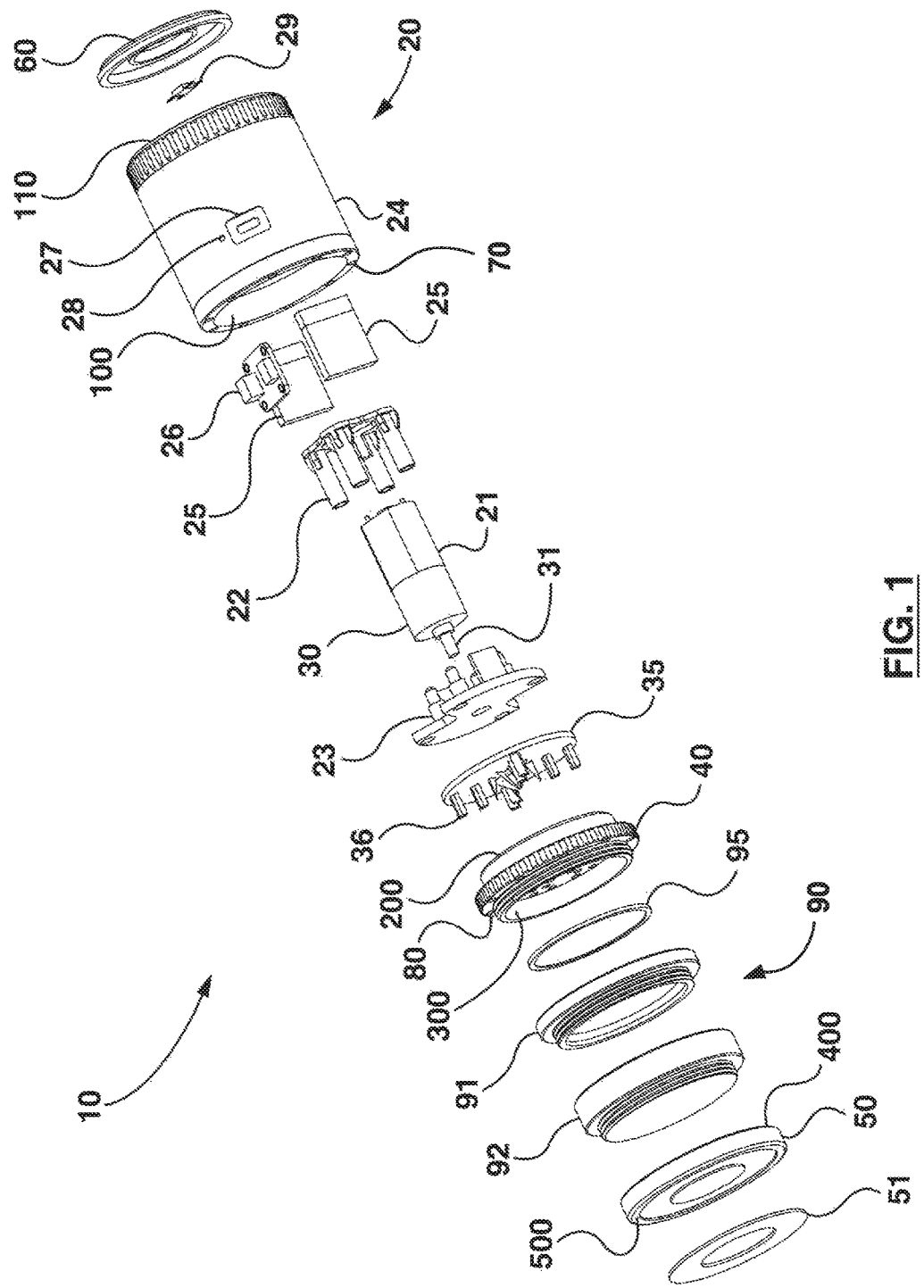
FIG. 1 depicts an exploded view of one embodiment of a portable herb grinder formed in accordance with the present invention, including an optional storage section and screen.

Referring to FIG. 1, there is generally shown a portable herb grinder 10 formed in accordance with the present invention. The portable herb grinder 10 comprises a top section 20, a disc 35, a middle section 40, and a bottom section 50.

The top section 20 further comprises a motor 21, which is housed between a top motor mount 22 and a bottom motor mount 23. The top motor mount 22 and the bottom motor mount 23 are connected so as to support the motor 21 and provide a structure that prevents the motor 21 from rotating with respect to the top section 20 when using the portable herb grinder 10.

The top section further comprises a top body 24. In the preferred embodiment of the present invention, the top body is formed as a hollow cylinder defining an interior volume for housing the motor 21, the top motor mount 22 and the bottom motor mount 23. The open ends of the top body 24 provide for a bottom opening of the top section 100 and a top opening of the top section 110 respectively. One of either the top motor mount 22 or the bottom motor mount 23 are fixedly attached to the interior of the top body by means (not shown) that are sufficient to withstand the torque produced by operating the motor 21, wherein when the top body 24 is constrained from rotation, thee motor 21 to be similarly constrained.

In the preferred embodiment of the present invention, the motor 21 is electric, and is powered by a rechargeable battery system comprising at least one rechargeable battery unit 25 and a control unit 26. Preferably, the control unit 26 is positioned within the interior volume of the top body 24 and adjacent a port 27 communicating with the exterior of the top body 24 to allow for the connection of a power cable for recharging the rechargeable battery system. Optionally, there may also be an indicator 28 that is in communication with the controller 26 and observable by a user and is capable of indicating the status of the rechargeable battery system. The portable herb grinder 10 may also comprise an on/off switch for the device (not shown). Optionally, the indicator 28 can communicate to a user as to whether the portable herb grinder 10 is on or off, or the amount of charge remaining in the rechargeable battery system. The indicator may be fashioned from one or more light emitting diodes, and may communicate to a user through various means known in the art such as different colours, flashing patterns, or separate elements of the indicator being in different states.

In the preferred embodiment, two rechargeable battery units 25 are used, and each is comprised of a low profile, lithium ion polymer battery with an output voltage of approximately 3.7V, and capacity of 500 mAh, for a total battery life of approximately 1.9 Wh. It will be understood that numerous other rechargeable battery units may be selected and chosen within the scope of the current invention.

It will be further understood that the motor 21 and the rechargeable battery system are in electrical communication via a switch 29 that can be triggered by a user to engage the motor 21. In one embodiment of the invention the switch is located adjacent to top opening of the top section 110. Optionally, a cap 60 may be positioned adjacent the switch 29. In a preferred embodiment, the cap 60 is a flexible and resilient disc that is fixedly connected to the top body 24 adjacent to the top opening of the top section 110 so that when a user depresses the cap 60, the switch 29 is engaged and the circuit powering the motor 21 is energized. Cap 60 may further comprise indicia for the purposes of marketing or identifying the portable herb grinder 10.

It will be understood that the motor 21 further comprises an output shaft 31 for transmitting the rotational energy produced by the motor 21. Optionally, the motor 21 may further comprise a gear mechanism 30 positioned between the electric motor and the output shaft 31 as is generally known in the art. In the preferred embodiment, the motor 21 is combined with a gear mechanism 30 to provide a gear ratio of approximately 150:1 and a no-load speed of approximately 90 RPM. This optional gear mechanism may be selected, however, with other combinations of speed and torque in accordance with the invention described herein that are suitable to ensure the particular portable herbs or vegetative material are sufficiently ground by the portable herb grinder 10.

Figure 2B:
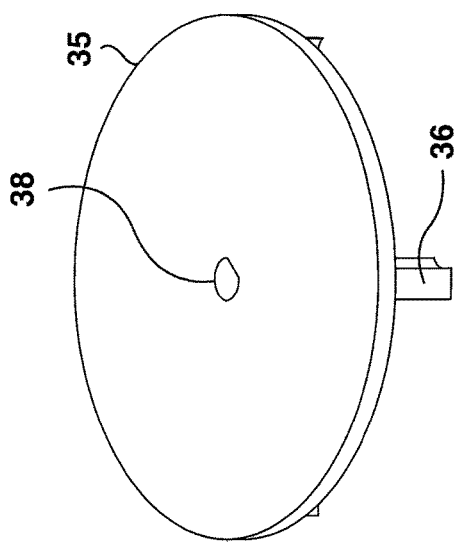
FIG. 2(*a*) depicts a plan view of a plate of the portable herb grinder of FIG. 1.
Figure 2A:
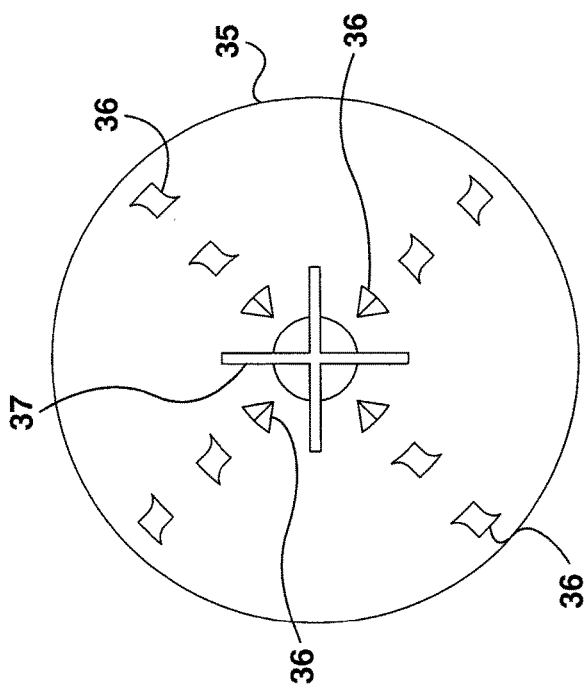
Figure 2C:
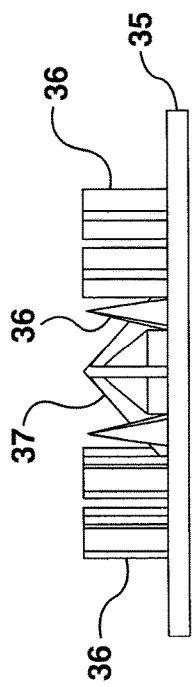

With further reference to FIGS. 2(a)-(c), the portable herb grinder 10 of the present invention further comprises a disc 35. Disc 35 comprises a plurality of top grinding knives 36 fixedly attached to one surface of the disc 35. Preferably, the top grinding knives 36 are right, generally rectangular prisms with four sharp edges for grinding, commutating or shredding vegetative material. Optionally, a portion of the top grinding knives 36 may adopt alternate shapes with differing numbers of sharp edges, such as oblique pyramids. In addition, the disc 35 may comprise a centre post 37 fashioned to ensure that material to be ground does not become trapped at the centre of the surface of the disc 35 when in operation.

Disc 35 is fixedly connected to the output shaft 31 through any suitable means, including a keyed aperture 38 fashioned to mate by compression fit with the output shaft 31. When assembled in accordance with the present invention, the disc 35 is positioned and oriented so that the top grinding knives 36 protrude downward towards the middle section 40 and the disc 35 and top grinding knives 36 rotate within the bottom opening of the top section 100. This can be seen more clearly with reference to cross section of the portable herb grinder 10 shown in FIG. 4(b).

With further reference to FIGS. 3(a)-(b), the middle section 40 comprises a top opening of the middle section 200, a bottom opening of the middle section 300, and a plate 41. The top opening of the middle section 200 is dimensioned so as to be removably inserted into the bottom opening of the top section 100. The plate 41 further comprises a plurality of bottom grinding knives 42 protruding upwards towards the bottom opening of the top section 100, and a plurality of apertures 43 in communication with the bottom section 50 that allow ground material to travel through plate 41.

Similar to disc 35, the plurality of bottom grinding knives 42 are right, generally rectangular prisms with four sharp edges for grinding, commutating or shredding vegetative material. Optionally, a portion of the bottom grinding knives 42 may adopt alternate shapes with differing numbers of sharp edges, such as oblique pyramids. It will be understood by one skilled in the art that the number and relative positioning of the top grinding knives 36 and bottom grinding knives 42 can be chosen so that when disc 35 is rotated with respect to plate 42, the top grinding knives 36 and bottom grinding knives 42 travel circular paths in such a manner that vegetative material is ground, commutated, or shredded between their respective sharp edges.

As mentioned above, the top opening of the middle section 200 is dimensioned so as to be removably inserted into the bottom opening of the top section 100. Optionally, at least one top magnetic element 70 may be located adjacent the bottom opening of the top section 100, and at least one middle magnetic element 80 may be located adjacent the top opening of the middle section 200 to cooperate to magnetically, releasably connect and align the top section 20 and the middle section 40. Other potential non-limiting releasable connections will be understood by one skilled in the art, and could include a compression fit, threaded surfaces or lug and slot style arrangements.

As described above, in one embodiment of the portable herb grinder 10 further comprises a bottom section 50 for collecting ground material that travels through the plurality of apertures 43. Bottom section 50 has a bottom surface 500, and a top opening of the bottom section 400 that is configured to be detachably connected to the bottom opening of the middle section 300. In the preferred embodiment of the present invention, the attachment is effected by compatible threaded surfaces adjacent to the top opening of the bottom section 400 and the bottom opening of the middle section 300, but other connections are allowable and contemplated within the scope of this invention. Optionally, the bottom surface 500 may be fitted with a friction surface 51.

In an alternate embodiment of the portable herb grinder 10, the portable herb grinder 10 may further comprise a storage section 90. Storage section 90 may comprise a storage cap 91 and a storage bottom 92 that may be removably attached to each other, and together define an internal storage volume where herb or vegetative material may be stored prior to or after grinding. Storage cap 91 is also configured to be removably attached to the bottom opening of the middle section 300 and storage bottom 92 is configured to be removably attached to the top opening of the bottom section 500. In this embodiment, the storage section 90 is thereby positioned between the middle section 40 and the bottom section 50.

In a further embodiment of the present invention, portable herb grinder 10 may further comprise a screen 95 positioned within the bottom opening of the middle section 300, and preferable adjacent the surface of the plate 41. The purpose of the screen 95 is to provide for the separation of ground material according to size, as determined by the dimensions of the mesh.

In the preferred embodiment of the present invention, top section 20, disc 30, middle section 40, and bottom section 50 are manufactured from aluminium. It will be understood by those skilled in the art, however, that other materials would be acceptable such as steel, rigid plastic and alike. Preferably, each of these components is cylindrically shaped and of substantially equal radius so as to connect or attach to each other as further described herein in an aesthetically pleasing and functional manner, but the scope of this invention is not limited to an overall cylindrical design.

In use, a user may place herb or vegetative material to be ground between the top grinding knives 36 and the bottom grinding knives 42 of the middle section 40, and then releasably connect the top section 20 to the middle section 40. The user may then hold the top body 24 and depress the cap 60. This motor will be activated under battery power to rotate the disc 35. The herb or vegetative material to be ground will be ground, commutated or shredded between the sharp surfaces of the top grinding knives 36 and bottom grinding knives 42 as they rotate with respect to each other. The user may select the duration of applying power to obtain a desired amount of grinding. Ground material that is small enough to travel through the apertures 43 and the screen 95 (if present) will be transported by vibration, agitation or gravity to the bottom section 50. Ground material that is larger than the apertures 43 or the screen 95 (if present) will be retained in the volume defined by the bottom opening of the top section 100 and the top opening of the middle section 200. The user may access these segregated portions of ground material by detaching the bottom section 50 from the middle section 40, or detaching the top section 20 from the middle section 40, respectively. The user my optionally hold either the bottom section 50 or middle section 40, or both simultaneously to prevent either from rotating with respect to the top section 20 while the motor is in operation. Alternatively, the user may place the portable herb grinder 10 on a suitable surface and rely on the friction created between the surface and the friction surface 51 to constrain the rotation of the bottom section 50 and middle section 40.

It is preferable that disc 35 only be able to rotate with respect to the motor 21, and thereby with respect to the top section 20, when there is power supplied to the motor. This allows a user to selectively rotate the disc 35 manually by rotating the top section 20 with respect to the middle section 40. This may be done to provide additional grinding, or to allow the portable herb grinder 10 to be operated even if the rechargeable battery system fails or is depleted of energy.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electrically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like). Similar logic can be applied for two or more items in any occurrence of "at least one . . . " and "one or more . . . " language.

Modifications, changes or alternate structures may be employed from the specific forms of the invention herein shown as typical examples will occur to those skilled in the art. All such modifications and changes, not departing from the spirit of invention, are intended to be embraced within the scope of the appended claims. Changes in detail or structure may be made without departing from the spirit of the invention as defined in the appended claims. In addition, although specific rates, speeds, and powers are described herein for illustrative purposes, those skilled in the art should appreciate that other rates, speeds, and powers are suitable for use with the present invention.

All directional references (e.g., upper, lower, upward, downward, left, right, leftward, rightward, top, bottom, above, below, vertical, horizontal, clockwise, or counter-clockwise), are only used for identification purposes to aid the reader's understanding of the embodiments of the present invention, and do not create limitations, particularly as to the position, orientation, or use of the invention unless explicitly set forth in the claims. Connection references (e.g., attached, coupled, connected, joined, and the like) are to be construed broadly and may include intermediate members between a connection of elements and relative movement between elements. As such, unless explicitly claimed, connection references do not necessarily infer that two elements are directly connected and in fixed relation to each other.

What is claimed is:

1. A portable herb grinder comprising:
   a top section having a motor, and a bottom opening;
   a disc having a plurality of top grinding knives, wherein the disc is connected to the motor for rotation within the bottom opening of the top section, and wherein the plurality of top grinding knives are oriented to protrude downward;
   a middle section having a top opening that is removably inserted into the bottom opening of the top section, a bottom opening, and a plate, wherein the plate comprises a plurality of bottom grinding knives protruding upward and a plurality of apertures; and
   a bottom section having a top opening that is removably attached to the bottom opening of the middle section, wherein the disc only rotates within the bottom opening of the top section when powered by the motor, thereby allowing the portable herb grinder to be operated manually and electrically.

2. The portable herb grinder of claim 1, further comprising a storage section, the storage section having a storage cap and a storage bottom, wherein the storage cap is removably attached to the bottom opening of the middle section and the top opening of the bottom section is removably attached to the storage bottom, and wherein the storage cap and the storage bottom are removably attached forming a storage volume.

3. The portable herb grinder of claim 1, wherein the bottom section further comprises a friction surface.

4. The portable herb grinder of claim 1, further comprising a screen for separating ground material within the bottom opening of the middle section.

5. The portable herb grinder of claim 1, wherein the top section, the disc, the middle section or the bottom section are made of aluminium.

6. The portable herb grinder of claim 1, wherein at least a portion of the plurality of top grinding knives or the bottom grinding knives have four sharpened edges.

7. The portable herb grinder of claim 1, wherein at least a portion of the plurality of top grinding knives or the bottom grinding knives have three sharpened edges.

8. The portable herb grinder of claim 1 wherein the top section further comprises at least one top magnetic element adjacent the bottom opening of the top section, and wherein the middle section further comprises at least one middle magnetic element adjacent the top opening of the middle section, wherein the at least one top magnetic element and the at least one middle magnetic element are positioned so as to alignedly guide the top section to magnetically attach to the middle section.

* * * * *